United States Patent [19]

Maxey

[11] 4,370,974
[45] Feb. 1, 1983

[54] INVERTED CHANNEL FOCUSING SOLAR COLLECTOR

[76] Inventor: Donald R. Maxey, 22522 Shiloh Church Rd., Boyds, Md. 20720

[21] Appl. No.: 129,649

[22] Filed: Mar. 12, 1980

[51] Int. Cl.³ .............................................. F24J 3/02
[52] U.S. Cl. .................................. 126/439; 126/429; 126/441
[58] Field of Search ............... 126/438, 439, 441, 429; 350/293; 136/259

[56] References Cited

U.S. PATENT DOCUMENTS

| | | | |
|---|---|---|---|
| 3,974,824 | 8/1976 | Smith | 126/438 |
| 4,011,855 | 3/1977 | Eschelman | 126/438 |
| 4,026,273 | 5/1977 | Parker | 126/438 |
| 4,079,724 | 3/1978 | Zwillinger | 126/441 |
| 4,149,521 | 4/1979 | Miller et al. | 126/438 |
| 4,222,370 | 9/1980 | De Geus | 126/439 |
| 4,237,864 | 12/1980 | Kravitz | 126/438 |

FOREIGN PATENT DOCUMENTS 2353026 12/1977 France ................................ 126/439

Primary Examiner—James C. Yeung
Assistant Examiner—Lee E. Barrett
Attorney, Agent, or Firm—A. W. Breiner

[57] ABSTRACT

A solar energy collector in the shape of an inverted geometric cusp of the second kind which permits the collection of direct and diffuse solar radiation, and which attenuates losses by thermal convection, conduction, and reverse radiation or re-radiation of energy to the cold or night sky. The solar collector when utilized in a composite unit is compact, has an aesthetically pleasing low profile, and alleviates the need for elaborate sensing and tracking mechanisms.

15 Claims, 6 Drawing Figures

U.S. Patent  Feb. 1, 1983  Sheet 1 of 2  4,370,974
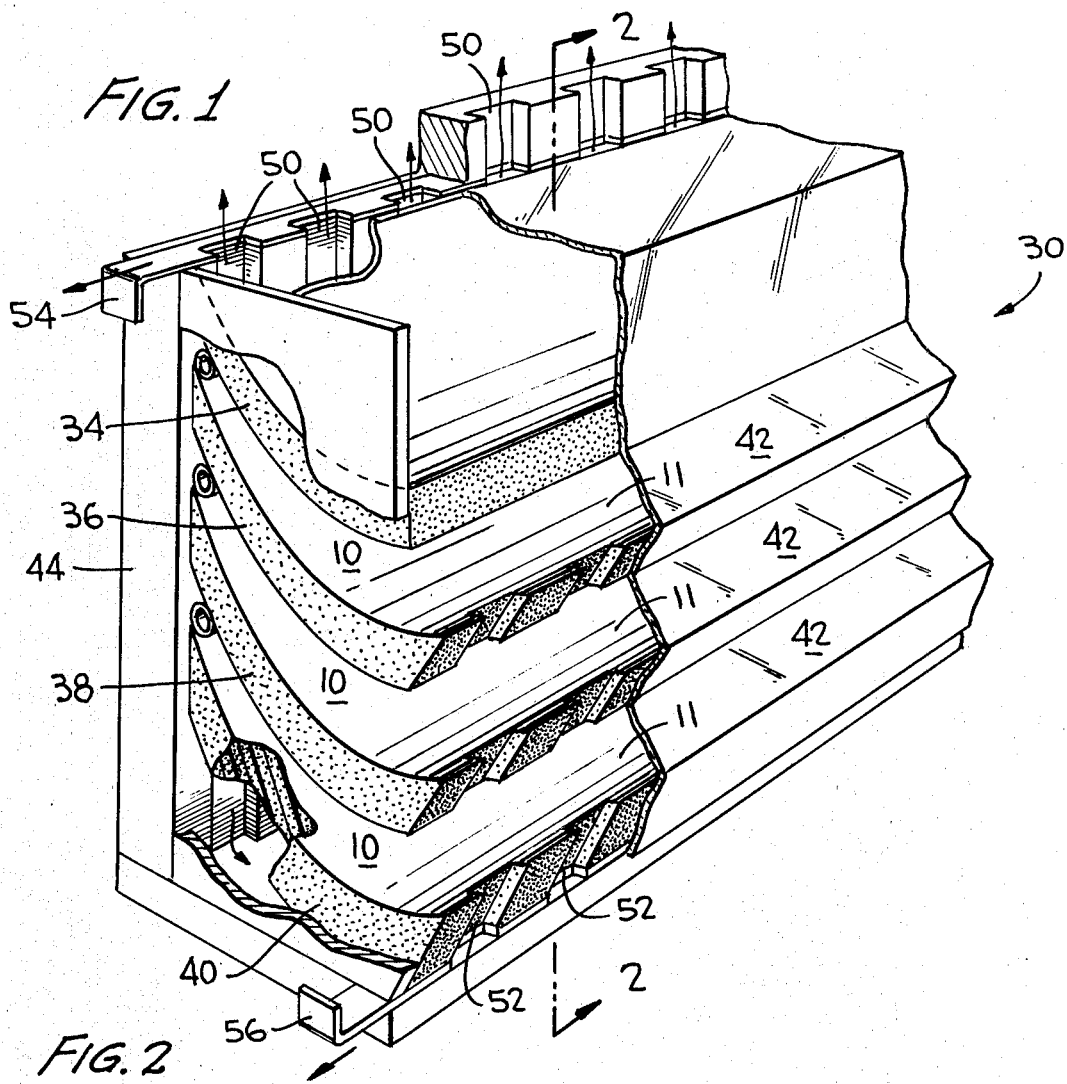
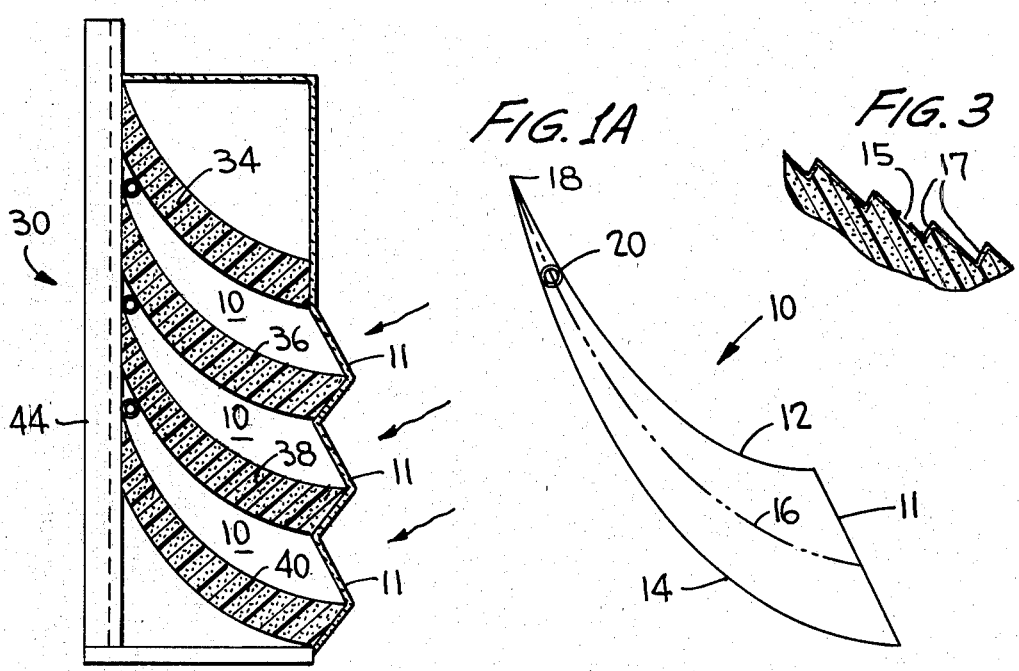

INVERTED CHANNEL FOCUSING SOLAR COLLECTOR

FIELD OF INVENTION AND BACKGROUND

This invention relates to an apparatus for collecting radiant solar energy and, more particularly, to a solar collector which optimizes the collection of direct and diffuse solar radiation and attenuates losses due to thermal convection, conduction, and reverse radiation.

Numerous systems have been proposed for the utilization of solar energy which generally comprise a collector unit which directs solar energy onto an energy-receiving means such as an evaporator unit or a conduit for a heat-exchange medium. In contradistinction to conventional fuel burning systems, the aforesaid solar devices provide a non-polluting source of usable energy. In one type of prior art system, large black aluminum collectors absorb the sun's energy beneath rigid sheets of transparent plastic. In such systems, a flat sandwich-like assembly is positioned to be aimed in the direction of the sun and tilted at an angle to collect the sun's rays. These prior art systems, while being useful, are generally excessively large and obstrusive for many conventional applications.

Other prior art systems have been suggested utilizing one or more reflector units which are mounted on a framework which changes its inclination corresponding to the elevation of the sun, thereby assuring that the reflected solar energy will always be directed at the energy-receiving means. Such systems impose severe restrictions on the size of the reflector assembly in that the assembly must be capable of swinging movement in a vertical plane.

Still other prior art systems have been suggested wherein frames carry a plurality of individually inclinable reflector units of parabolic cross-sections, with each reflector unit having its own energy-receiving means located at the focus of the parabola.

All such systems have limitations in that they either do not collect the diffuse or random incident rays from an overcast or cloudy sky, or they require a mechanism to adjust the collectors to the direction of the sun's rays which leads to troublesome maintenance and/or expensive components. All of the aforesaid units permit reverse radiation at times of a cold sky, i.e., at night, and also tend to lose heat by thermal convection and conduction.

More recently units have been suggested, for example, in U.S. Pat. Nos. 3,179,105; 3,229,682; and 3,923,039, which provide a significant improvement in collecting incident rays over the conventional focusing parabolic collectors which must track the sun, or flat plane collectors which cannot concentrate heat. However, the designs of the solar collectors in the aforesaid patents are cumbersome and/or expensive to manufacture and install, and/or cannot be fabricated on vertical or sharply inclined surfaces. Moreover, all permit reverse radiation as well as loss of thermal energy by convection and/or conduction.

OBJECTS AND SUMMARY OF THE INVENTION

Accordingly, it is a primary object of this present invention to provide a focusing solar collector which collects, without need to track the sun, direct and diffuse radiation and which attenuates energy losses by reverse radiation, thermal convection, and conduction.

It is another object of this invention to provide a solar collector which collects direct and diffuse radiation and which attenuates energy losses by reverse radiation, thermal convection, and conduction, which can be mounted vertically on the wall or within the roof of an existing house and which is of compact structure.

It is another object of this invention to provide a channel focusing solar collector which is in the design of an inverted geometric cusp of the second kind or a multifaceted approximation of said inverted cusp of the second kind.

It is another object of this invention to provide a channel focusing solar collector in the shape of an inverted geometric cusp of the second kind wherein the heat collector or absorber is positioned higher than the entrance for solar radiation so as to provide a trap for the solar radiation and to maintain a positive thermal convection gradient toward the vertex of said cusp of the second kind.

It is another object of this invention to provide a channel focusing solar collector constructed of sheet metal or other strong and durable material in the shape of an inverted geometric cusp of the second kind as a concentrator of radiant energy upon an array of photovoltaic cells positioned within the vertex of said cusp of the second kind so as to maximize protection of the relatively fragile photo cells from the chronic destructive effects of wind, birds, and ultraviolet radiation.

These and other objects of the invention will be apparent from the following general description of the invention and the detailed description of presently preferred embodiments.

The aforesaid objects of the inventions are accomplished by constructing a solar collector in the shape of an inverted geometric cusp of the second kind. The solar collector in the shape of an inverted geometric cusp of the second kind comprises a structure having two concave planar surfaces curving upwardly from a first end in the same direction so as to ultimately intersect, whereby the point of intersection is higher than the first ends. A radiant energy absorber which can be a fluid conduit or photovoltaic cell array is positioned within the structure, preferably horizontally, at or in proximity to the point of intersection so that the two concave planar surfaces are tangent or substantially tangent with opposite sides of the radiant energy absorber. Since the radiant energy absorber, being proximate to the point of intersection, is positioned higher than the entrance of the solar radiation, energy losses by thermal convection and reverse radiation will be attenuated and reradiation of energy to the cold or night sky will be reduced.

The design of a system based on the present invention, wherein the concave planar surfaces forming the collector cusps preferably have cavities approximating any of the conical sections, spirals, lituuses, limacons, catenary, or logarithmic curves, will have a low profile which is aesthetically pleasing and compact on installation. The collector, because of its ability to collect both diffuse and direct solar rays from a static position, provided the concave planar surfaces are longitudinally oriented along an east-west azimuth, avoids the need for elaborate sensing and tracking mechanisms.

THE DRAWING AND DETAILED DESCRIPTION OF A PREFERRED EMBODIMENT

In the drawing,

FIG. 1 is a fragmentary, partially sectioned end view of a solar energy collector unit having three collector cusps;

FIG. 1A is a diagrammatic end view of a solar collector in the shape of an inverted geometric cusp of the second kind;

FIG. 2 is a cross-sectional view taken along lines 2—2 of FIG. 1;

FIG. 3 is a magnified view of surface 14 of the collector of FIG. 1 having radiation entrapment facets;

Figure 4:
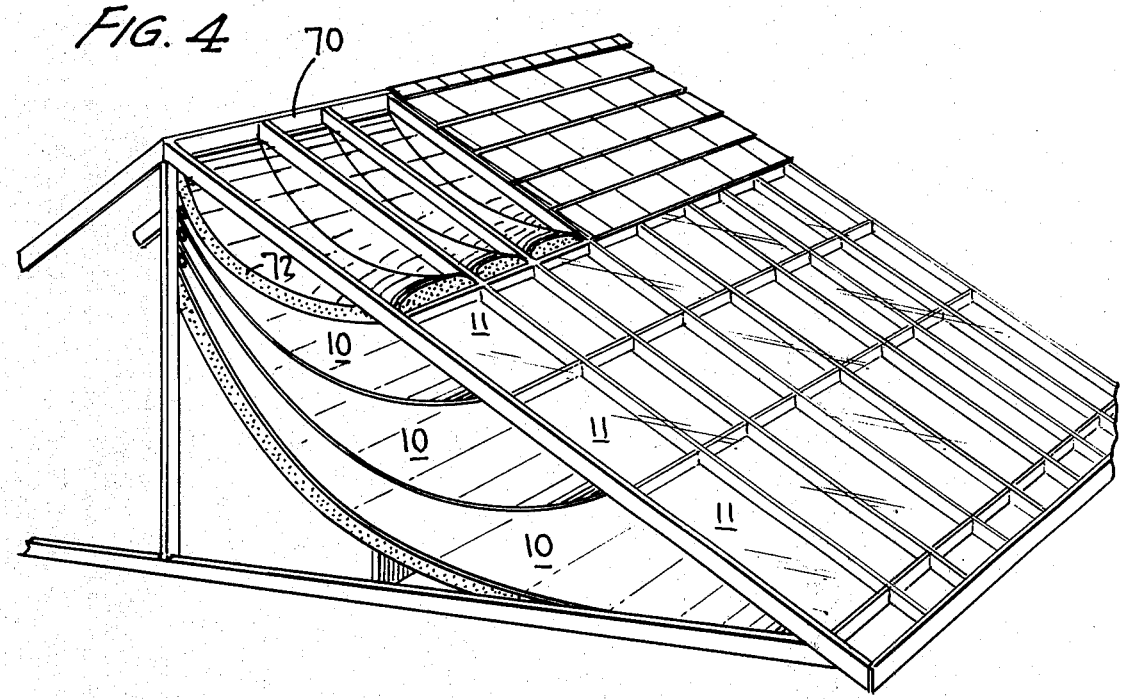
FIG. 4 is an end sectional view of a roof solar energy collector with suspended catenary cusps of the second kind.

As illustrated in FIG. 1A, solar collector cusp 10 includes two concave planar surfaces 12 and 14 curving upwardly to a point of intersection 18. Each collector cusp 10 includes a suitable heat or energy absorber 20 proximate to point 18, and as shown in FIG. 1A is sandwiched between paired concave planar surfaces 12 and 14, on central axis 16.

It is inherent in this design that solar radiation, without regard for the time of day, initially strikes the lower reflective surface of inverted cusp 10 at an acute angle-of-incidence from which it can only be reflected inward and upward with progressively diminishing angles of incidence, thus assuring maximum delivery of all incident radiation to the absorber, both direct and diffuse, without the necessity of correcting for daily and annual variations in the relative position of the sun.

The collector cusps of this invention, as shown in FIGS. 1 and 2, preferably are utilized in composite units 30 with each unit preferably having at least three individual collector cusps 10. Composite unit 30 as shown in FIGS. 1 and 2 is designed to be in contact with and attached to a wall of a building, not shown. The composite unit, comprising three collector cusps 10, is approximately 64 inches wide, 64 inches high, and 22 inches deep. Collector cusps 10 can be individually formed from reflector members and then sandwiched together with mated insulating members 34, 36, 38, and 40 which separate and insulate the individual collector cusps from each other. Alternately and preferably, insulated members 34, 36, 38, and 40 are individually formed with suitable reflector surfaces and then mated to form collector cusps 10 within a south facing wall or roof, or within a separate containment structure. The supporting end panels of such composite installations would also be covered with reflective materials on their internal surfaces.

The opening of passage 11 of each of the collector cusps is preferably covered with a protective plate 42 which can be glass, clear plastic, or the like. On installation, the back member 44 is positioned against the wall of a building in order that the long axis of the collector surface is oriented along an east-west azimuth so as to direct or channelize energy to the absorber unit throughout the day. Although not essential, it can be desirable to include in the collector unit convection grooves for circulating air. Referring to FIG. 1, air convection grooves 50 are provided at the back of the unit and grooves 52 are provided at the front of the unit. As also shown in FIG. 1, slotted control bars 54 and 56 are provided to permit opening and closing of the convection grooves 50 and 52. As apparent, depending on the position of the slots, air can circulate in front of the cusp partitions and return around the back of the partitions, thereby preventing restriction of air movement by temperature inversion, or the air can circulate through and out of the unit. The vents, by means of slotted control bars, are normally controlled in order that in cold weather there is internal cycling of the air and in hot weather so that there is a venting of the air to the atmosphere.

In operation, solar radiation enters passage 11 and is reflected along the walls 12 and 14 of the inverted geometric cusp of the second kind to the absorber 20. Since the absorber 20 is higher than the opening, losses by thermal convection and reverse radiation or re-radiation of the collected energy during the night or periods of cloudiness are reduced or eliminated. Thus, the need for antifreeze in the system or draining of the system is avoided.

Surface 14 of collector cusp 10 can be modified, as illustrated in FIG. 3 in magnification, by including radiation entrapment facets on the lower (concave) walls 14. The reverse or vertex facing surface of each faceted groove is molded to be essentially perpendicular to cusp axis 16 so as to intercept radiation emitted by the absorber and reflect it back for reabsorption while the inward sloping top surface of each groove is molded so as to form an acute angle with the cusp axis thus permitting the passage of radiant energy from entrance 11 to absorbers 20 while preventing the passage of radiation exiting from the cusp.

The radiation entrapment facets may be of different sizes dependent upon the scale of the collector cusp. The essential features of facet design are:

1. The inward facing facet of each radiation entrapment groove must be approximately perpendicular to the central axis of the cusp and longitudinally parallel to the absorption element.
2. The wider, more centrally facing surface of each faceted groove must lie in a plane that intercepts the central axis of the cusp at an acute angle (preferably less than thirty degrees).

The efficiency of the radiation entrapment facets may be improved by gradually reducing the slope of the centrally facing surface of successive faceted grooves from a maximum slope in the mid-region of each cusp through progressively diminishing slopes to a completely smooth reflective surface at each end of the cusp.

The collectors and units are constructed using conventional materials. If a fluid conduit heat absorber is employed, the absorber can be a black heat collector pipe with the heat absorbers for the several collectors being manifold to a suitable heat-exchange system. Insulating members 34-40 and base member 44 are preferably constructed from an insulating polymeric foam such as styrene or polyurethane. In a preferred embodiment, a unit is made by rendering the surfaces of the insulating members reflective as, for example, by cutting or molding foam members in the desired shape; wrapping the pre-formed foam members with a light-reflective material such as aluminized Mylar, and assembling the components. This method of fabrication precludes the need for separately forming the collector surfaces, making the design relatively inexpensive and commercially practical.

Incident solar radiation, both direct and diffuse, will be reflected one to several times between the rising sides and ends of each inverted geometric cusp with progressively diminishing angles of incidence until arriving at the absorber. A small fraction of this radiant energy will be converted to thermal molecular energy with each reflection; however, such converted energy will ultimately be delivered to the absorber by either the positive convection gradient or by conduction through the metallic reflector surface. Even that small percentage of heat which could be lost by downward conduction can be blocked or eliminated by a narrow interruption or break in the reflective surfacing along one or two of the lower radiation entrapment grooves immediately above the perpendicular facet so as to be shaded from incoming radiation. It could also be desirable in collectors where facets are not utilized, in order to block or eliminate downward heat conduction, to include a break or interruption in the reflective surfacing at a point in the lower one-third of the collector.

The heat conductive fluid which can be employed in the heat collectors are the conventional fluids such as water, air, ethyleneglycol, or the like. As above stated, inasmuch as heat losses from reverse reflection and reradiation are substantially eliminated, the need for antifreeze or the draining of the system is largely avoided.

The collectors in the embodiment illustrated in FIG. 4 in all respects follow the principle of the collectors in unit 30 of FIGS. 1 and 2. However, as shown, the collectors 10 in the shape of an inverted geometric cusp of the second kind is directly incorporated into the roof 70 of a new or existing house. As shown in FIG. 4, the surfaces of the collector except for the top and bottom surfaces are uninsulated and are formed from suspended flexible fabric to provide catenary surfaces which are reflective internally. The reflective flexible fabrics can be any suitable material such as aluminum foil laminates, aluminized Mylar, or aluminized cotton or synthetic fabric. As shown, only the top catenary surface of the uppermost collector 10 and the bottom of the lower collector require insulation 72, which may be similarly suspended catenaries of fiberglass blanket insulation or other conventional insulating material. The openings 11 of the parabolic cusp are covered with any transparent or translucent paneling such as glass, fiberglass, acrylic, polypropylene, or the like.

Those whose homes are not ideally oriented to a southern exposure or whose homes are shaded from the south by neighboring buildings or trees will now be granted a solar option. The roof mounted suspended catenary version of this invention may be installed with the catenary cusps opening in opposite directions from a centrally located common heat absorber element so as to receive optimum solar radiation from an easterly direction in the morning and from a westerly direction in the afternoon. Since the most expensive part of a solar collector is the energy absorber and its associated plumbing, this bicuspid version of the catenary collector offers a more cost-effective method of receiving solar energy from dual directions than is possible with either flat plate or focusing parabolic collectors.

Figure 5:
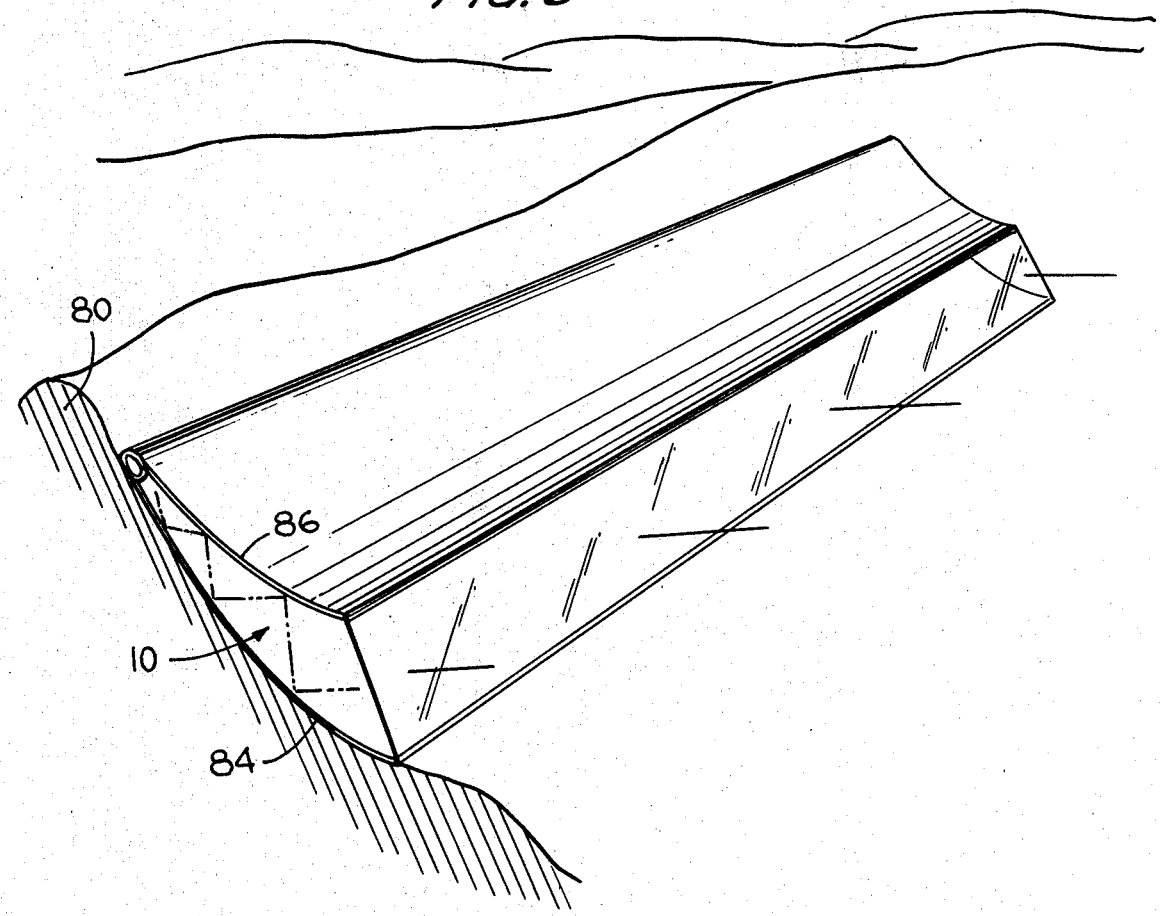
FIG. 5 is a solar energy collector in the shape of a parabolic cusp of the second kind excavated into the side of a mountain surface.

The embodiment of FIG. 5 shows a collector 10 formed by excavation of a suitable mountain surface 80, the long axis of the collector again oriented along an east-west azimuth. As shown in FIG. 5, mountain surface 80 is excavated to the shape of a parabolic concavity 84 and paved with a reflective material such as mica or quartz. Radiation entrapment facets, not shown, can be molded or pressed into the pavement. The top 86 of the parabolic cusp is then constructed of reinforced concrete or of a more flexible suspension bridge-type construction. The entrance 11 of the cusp can be opened or covered with a glazed surface. The principle of operation of the collector, although the collector is greatly enlarged, is identical to the principle of the collectors shown in FIGS. 1, 1A, and 2. The collector structure can extend from 600 to 1,000 feet in length, 50 feet in width, and 20 feet in height, depending upon the surface of the terrain; and is equipped with radiant energy absorbers such as a fluid conduit which can be used to directly heat a boiler or other heat-collecting material.

As will be apparent, the collectors of the present invention can take various forms. The essential feature of the collector is in having the collector constructed as an inverted geometric cusp of the second kind which provides for the absorption of all radiant energy without re-radiation. Various modifications, as will be apparent to one skilled in the art, can be made following the principles of the presently disclosed invention.

It is claimed:

1. A solar device comprising a horizontally oriented radiant and thermal energy absorber and a collector having two reflective curved planar surfaces curving downward from said absorber from a common side of a vertical plane drawn tangent to said absorber, one of said planar surfaces curving downward from one side of said absorber, and the other of said planar surfaces curving downward from the opposite of said one side of said absorber and each being in direct thermal conductive contact with said absorber, said curved planar surfaces supported by said horizontally oriented absorber, wherein the lowermost of said curved reflective surfaces approaches a plane of horizontal tangency sufficiently forward of the horizontal tangency of the uppermost reflective surface to delineate an aperture plane for the entrance of solar radiation which has an optimum angular inclination for the latitude; said reflective surfaces conforming essentially with the geometry of a cusp of the second kind in that they would intercept along a line of double tangency to a common reference plane if extended above said horizontally mounted radiant and thermal energy absorber.

2. The solar collector of claim 1 wherein said absorber is a fluid-containing conduit.

3. The solar collector of claim 1 wherein said absorber is a photovoltaic cell array.

4. The solar collector of claim 1 wherein the lowermost of said two curved planar surfaces is formed as a part of the natural terrain.

5. The solar collector of claim 1 wherein the internal surface of the lowermost of said two curved planar surfaces includes radiation entrapment facets.

6. The solar collector of claim 1 wherein the lowermost of the internal surfaces of said two curved planar surfaces comprise a thermal conductive layer on a relatively non-thermal conductive surface and said layer contains a linear parting in the said conductive surface to thereby reduce conductive loss.

7. A solar unit comprising a plurality of solar devices each including a horizontally oriented radiant and and thermal energy absorber and a collector having two reflective curved planar surfaces curving downward from said absorber from a common side of a vertical plane drawn tangent to said absorber, one of said planar surfaces curving downward from one side of said absorber, and the other of said planar surfaces curving downward from the opposite of said one side of said absorber and each being in direct thermal conductive contact with said absorber, said curved planar surfaces supported by said horizontally oriented absorber, wherein the lowermost of said curved reflective surfaces approaches a plane of horizontal tangency sufficiently forward of the horizontal tangency of the uppermost reflective surface to delineate an aperture plane for the entrance of solar radiation which has an optimum angular inclination for the latitude; said reflective surfaces conforming essentially with the geometry of a cusp of the second kind in that they would intercept along a line of double tangency to a common reference plane if extended above said horizontally mounted radiant and thermal energy absorber.

8. The unit of claim 7 wherein said solar devices comprise a plurality of individually formed curved elements of insulating material provided with a reflective surface and said individual elements mated to provide a dual function as the top surface of one collector cusp and the lower surface of the adjoining cusp.

9. The unit of claim 8 wherein said insulating material is a polymeric foam and said reflective surface is made by wrapping said foam with aluminized Mylar.

10. The unit of claim 8 wherein said insulating material is a polymeric foam and said reflective surface is made by wrapping said foam with aluminum foil.

11. The unit of claim 7 wherein said unit includes convection grooves at the front surface of said unit and at the back surface of said unit to provide thermal circulation.

12. The unit of claim 11 wherein said unit includes opening and closing means on said convection grooves.

13. The unit of claim 7 wherein said unit forms an integral part of a roof structure with said reflective curved planar surfaces being comprised of a flexible fabric suspended from said absorber.

14. The unit of claim 13 wherein said reflective flexible fabrics are comprised of aluminized Mylar.

15. The unit of claim 13 wherein said reflective flexible fabrics comprise aluminum foil laminates in caternary suspension.

* * * * *